May 31, 1938.                    C. SMITH                    2,118,987
VARIABLE INCIDENCE WING FOR AIRPLANES
Filed Nov. 7, 1935
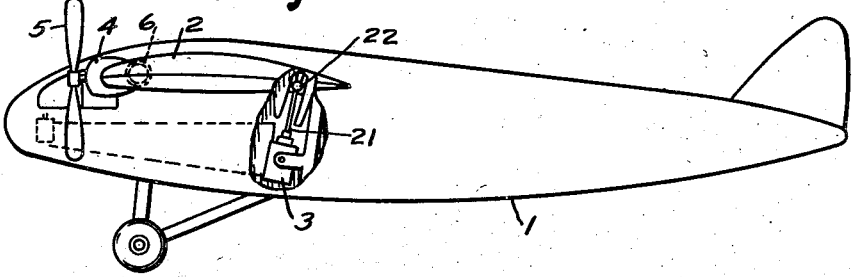
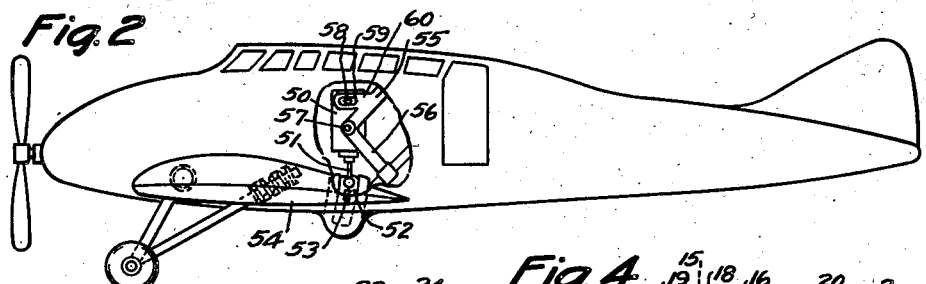
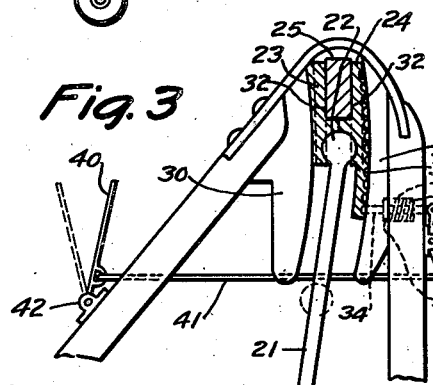
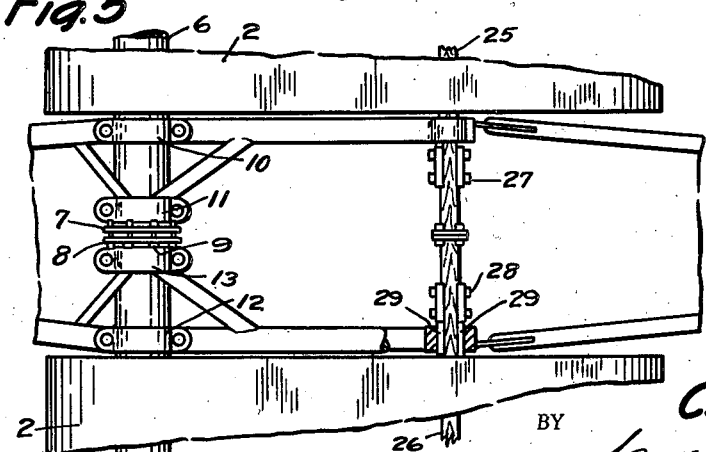
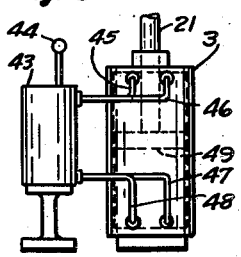
INVENTOR.
Charles Smith
BY James Harrison Bowen
ATTORNEY.

Patented May 31, 1938

2,118,987

UNITED STATES PATENT OFFICE 2,118,987

VARIABLE INCIDENCE WING FOR AIRPLANES

Charles Smith, New York, N. Y.

Application November 7, 1935, Serial No. 48,662

3 Claims. (Cl. 244—48)

The purpose of this invention is to provide an improved mounting for airplane wings of the type in which the angle or plane of the wing may be varied in relation to the fuselage, in which it is substantially impossible for the wings to separate from the plane, and also in which the positions of the wings may readily be adjusted.

The invention is a wing mounting for airplanes, which permits the cabin to remain substantially horizontal while the wings are maneuvered to assume various angles through which it may be desired to adjust the wings.

Adjustable wing mountings have been provided, however, it has been found that, as the wings of an airplane are subjected to exceptional and shock loads, any mounting that does not make it absolutely impossible for the wing to separate from the fuselage is impracticable and objectionable, and, therefore, it has been found absolutely necessary to provide a wing mounting in which the main spars of the wings extend into the fuselage, and are positively held therein, while at the same time permitted to turn in the said mounting means.

The object of the invention is to provide means for increasing the angle of incidence of airplane wings in relation to the fuselage, without any possibility whatever of the wing separating from the fuselage.

Another object is to provide an absolutely positive airplane wing mounting, in which means is provided for locking the wings in any position.

A further object of the invention is the provision of an arrangement of lifting jacks to move the wing or wings of an airplane to achieve the various desired altitudes airplanes usually go through.

A further object of this invention is the provision of automatic means to allow the propulsive units like airplane motors and propellers to give additional force in the directions the airplane is desired to go, that additional force being adopting the propulsive components not in line with that of the desired direction of the airplane but automatically brought in line.

And a still further object is to provide an absolutely permanent adjustable wing mounting for wings of airplanes, which is of a simple and economical construction.

Further objects of the invention are to increase the performance of airplanes under all conditions of flight, as in the following objects:

To reduce the distance required for airplanes to take off the ground or water for a flight.

To increase the forward flying speed of airplanes while in a horizontal flying position.

To increase the lifting capacity of airplanes.

To increase the maximum top ceiling of airplanes.

To decrease the distance required for airplanes to land on ground or water.

To decrease the possibility of airplanes stalling due to insufficient forward flying speed.

With these ends in view the invention embodies an airplane having wings with relatively large spars extending through the forward edges thereof, and into the fuselage to a point substantially in the center thereof, bearings in the fuselage in which the said spars are mounted, means holding the ends of the spars together, means positively raising and lowering the rear portions of the wings through rear wing beams also extending into the fuselage, and means locking and holding the wings in different positions.

Figure 1 is a view showing a side elevation of an airplane of the type having the motor mounted upon the wings, with part broken away showing the wing control mechanism.

Figure 2 is a similar view showing an alternate design, also with part broken away showing the wing control mechanism.

Figure 3 is a detail showing the wing control mechanism.

Figure 4 is a cross-section through the fuselage, with parts omitted showing the wing mounting at one side, and with part broken away showing the relative position of the wing control mechanism at the other side.

Figure 5 is a plan view showing the wing mounting with parts broken away.

Figure 6 is a detail showing an arrangement of the wing control mechanism.

In the drawing the device is shown as it may be made, wherein numeral 1 indicates an airplane body or fuselage, numeral 2 a wing, and numeral 3 a cylinder by which the trailing edge of the wing may be moved upward and downward.

It will be understood that this device may be used on an airplane of any type or design, and the wing may be mounted on the upper part of the fuselage, or at the lower part, or in any position in which the front beam or spar may extend into the fuselage.

In the design shown in Figure 1, the wing 2 is mounted in the upper part of the fuselage, with motors 4 mounted on the forward edges of the wings, and propellers 5 mounted on the motors, and the wings are constructed with a cylindrical or tubular front beam or spar 6, as indicated by the dotted lines in Figure 1, and shown in Figures 4 and 5. This beam extends substantially throughout the forward edge of the wing, and into the fuselage, with the inner ends of the beams extending inward from the wings provided with flanges 7 and 8 which may be bolted together by bolts 9. The end of the beam extending from one wing is held in bearings 10 and 11, and the end of the beam of the opposite wing mounted in bearings 12 and 13, and it will be noted that this provides a bearing at the outer edge of the fuselage, and also an additional bearing at the center thereof supporting the spar at two points, and thereby rigidly holding the wings. The bearings are mounted on any suitable parts of the airplane body or fuselage, and these may be of any type or design.

In the design shown in Figure 4 the inner ends of the beams, which are indicated by the numeral 14, are provided with flanges 15, and these are held in bushings 16 in the bearings 17, and the bushings are provided with flanges 18 which are bolted together by bolts 19. This makes it possible for one beam to rotate without the other, so that one wing may be turned to a greater angle than the other, and, at the same time, the wings are positively held, and absolutely prevented from separating from the airplane body or fuselage. In this design the beams are also held in outer bearings 20 at the sides of the fuselage. It will be understood that the wing mounting, therefore, consists of beams or spars extending through the forward edges of the wings, with their inner ends flanged and bolted, or held together, permitting the wings to turn, and both may turn together, or one may turn independent of the other.

The wings turn or rotate about the centers of the spars or beams 6, and the trailing edges are held so that the movement thereof is restricted and controlled by the cylinders 3 which may be mounted above or below the trailing edges of the wings.

The cylinders 3 are provided with connecting rods 21 having balls 22 at their upper ends, and these are held in split blocks formed by the sections 23 and 24, which are bolted together through rear wing beams 25 and 26 by bolts 27 and 28, and these blocks are provided with extensions 29 which extend through bearings 30 and 31, having curved inner surfaces, shaped to correspond with similarly shaped surfaces at the sides of the extensions 29, permitting the extensions and blocks to travel upward and downward. The beams 25 and 26 are clamped in recesses 32 in the blocks, and these beams extend through the rear portions of the wings, so that, as the blocks are moved upward and downward by the connecting rods 21 from the cylinders 3, the trailing edges of the wings will also move upward and downward.

The rear edges of the sections 24 of the blocks are provided with notches 33, into which a latch 34 may extend as shown in Figure 3, and the latch is resiliently held inward by a spring 35 in an opening 36, in which the pin is provided with a collar 37 against which the spring bears. The outer end of the pin 34 is connected to a lever 38 pivotally mounted in a bearing 39, and connected to an operating lever 40 through a rod 41. The lever 40 is pivotally mounted in a bearing 42, and it will be noted that this may be drawn forward to release one of the blocks to permit it to be moved upward or downward. It will be understood that any other locking means may be provided that may be operated from a remote point, and that will lock and hold the trailing edges of the wings in any suitable position.

A typical arrangement of the cylinders 3 is shown in Figure 6, in which the opposite ends of the cylinders are connected by double pipes to a control valve 43 operated by a lever 44, and it will be noted that any suitable multiple valve may be used in the device 43, and this may be connected by two tubes 45 and 46 at the upper end, and 47 and 48 at the lower end, to the cylinder 3, and these connections may be made so that an equal pressure may be maintained on each side of a piston 49 on the end of a connecting rod 21, and the piston 49 may readily be moved by increasing the pressure on one side, or at one end of the cylinder, and decreasing the pressure at the opposite side. With the double connections it is possible to absolutely control the position and movement of the piston as there is a pressure supply connection, and also a return or escape connection at each end of the cylinder.

In the design shown in Figure 2 the position of the cylinder is reversed, and the cylinder is indicated by the numeral 50, and the connecting rod 51 extends downward to a sliding block 52, which is connected to the rear beams 53 of the wings 54. The cylinder may be pivotally mounted in struts 55 and 56 through a bearing 57, and the upper end may also be held by pins 58 in slots 59 in members 60 of the frame of the body or fuselage. It is understood, however, that the cylinders may be mounted and controlled by any other means or in any other manner. In this design the wheels 61 are mounted on the undersides of the wings 54 so that they move forward and upward as the trailing edges of the wings move downward.

It will be understood, therefore, that this method of mounting and controlling the positions of the wings may be used with the propellers and engines, or landing gear, mounted on the wings or fuselage as may be desired.

It will also be understood that other changes may be made without departing from the spirit of the invention. One of which changes may be in the use of other means for raising and lowering the trailing edges of the wings, another may be in the use of other means for locking the wings in any position, and still another may be in the use of other means for securing the inner ends of the spars or front beams of the wings in the fuselage.

The construction will be readily understood from the foregoing description. In use this wing mounting may be incorporated in an airplane as shown and described, and it will be noted that, in taking off, the pilot moves the lever 44 so that the cylinder will draw the rear edges of the wings downward, nosing the forward edges upward, and after it has reached the desired elevation, or at any time, he may gradually move the lever backward so that the wings will assume a horizontal position for flying on a level, or horizontal, and then, when it is desired to land, this action is repeated, so that the wing has a tendency to bank the plane, forming a brake restricting the forward movement thereof. This makes it possible to positively control the movement of the wings by operating a simple lever, and, at the same time, with the assurance that the wings are positively secured, so that they may be moved without danger of coming off, or separating from the fuselage.

I claim:

1. A wing mounting for airplanes in which raising and lowering means is provided at the trailing edges of the wings comprising, cylindrical trunnions forming spars extending through the leading edges of the wings and into the fuselage to a point midway thereof, means holding the inner ends of said spars preventing separation thereof, and permitting turning of one wing in relation to the other, and bearings at the sides of said fuselage for said spars.

2. In combination with a wing mounting as described in claim 1, mechanical means locking the trailing edges of the wings in different positions.

3. In combination with a wing mounting as described in claim 1, means raising and lowering the trailing edges of the wings, and means readily locking said trailing edges in different positions.

CHARLES SMITH.